US012497270B2

(12) United States Patent
Gomez Mora et al.

(10) Patent No.: US 12,497,270 B2
(45) Date of Patent: Dec. 16, 2025

(54) CRANE ASSEMBLIES AND METHODS FOR ERECTING TOWERS AND WIND TURBINES

(71) Applicant: General Electric Renovables Espana, S.L., Barcelona (ES)

(72) Inventors: Daniel Gomez Mora, Barcelona (ES); Joel Frax Cervera, Barcelona (ES); Cornelis Josephus Andreas Van Son, Laren (NL); Louweris Rémon Kalter, Zwolle (NL); Lance Lambertus Peter Bakker, Ermelo (NL); Aris Jan van Egdom, Barneveld (NL); Frank Rozeboom, Lelystad (NL); Dries Vis Vis, Nunspeet (NL); Willem Haje Boer, Wapenveld (NL)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 204 days.

(21) Appl. No.: 18/562,903

(22) PCT Filed: May 25, 2022

(86) PCT No.: PCT/EP2022/064168
§ 371 (c)(1),
(2) Date: Nov. 21, 2023

(87) PCT Pub. No.: WO2022/248536
PCT Pub. Date: Dec. 1, 2022

(65) Prior Publication Data
US 2024/0262658 A1 Aug. 8, 2024

(30) Foreign Application Priority Data
May 26, 2021 (EP) .................................... 21382478

(51) Int. Cl.
*B66C 23/20* (2006.01)
*B66C 23/32* (2006.01)

(52) U.S. Cl.
CPC ............ *B66C 23/207* (2013.01); *B66C 23/32* (2013.01)

(58) Field of Classification Search
CPC ..... B66C 23/207; B66C 23/185; B66C 23/32; B66C 23/30; B66C 23/28; B66C 23/20
See application file for complete search history.

(56) References Cited

U.S. PATENT DOCUMENTS 3,485,384 A * 12/1969 Yu ........................... B66C 23/32 212/270
8,584,801 B2 11/2013 Baxter
(Continued)

FOREIGN PATENT DOCUMENTS

CN 101590982 A 12/2009
CN 103130106 B 1/2016
(Continued)

OTHER PUBLICATIONS

European Search Report Corresponding to EP21382478 on Nov. 19, 2021.
(Continued)

*Primary Examiner* — Anna M Momper
*Assistant Examiner* — Juan J Campos, Jr.
(74) *Attorney, Agent, or Firm* — Dority & Manning, P.A.

(57) ABSTRACT

A crane assembly for erecting a tower from a plurality of tower sections includes a first telescopic mast connected to a second telescopic mast. A crane is mounted on top of the first telescopic mast. The first telescopic mast is configured to increase in length from a retracted state in a first direction and includes a first clamp assembly that selectively grips portions of the tower. The second telescopic mast is con-
(Continued)

figured to increase in length from a retracted state in a second direction opposite to the first direction and includes a second clamp assembly that selectively grips portions of the tower.

15 Claims, 13 Drawing Sheets

(56) References Cited

U.S. PATENT DOCUMENTS

| | | | |
|---|---|---|---|
| 9,016,029 | B2 | 4/2015 | Wagner |
| 9,238,923 | B2 | 1/2016 | Arlaban Gabeiras et al. |
| 9,266,701 | B2 | 2/2016 | Bosco et al. |
| 9,376,291 | B2 | 6/2016 | Laurens et al. |
| 9,394,880 | B2 | 7/2016 | Zuteck |
| 9,403,665 | B2 | 8/2016 | Herse |
| 9,469,512 | B2 | 10/2016 | Garacia De La Pena Razquin |
| 9,651,020 | B2 | 5/2017 | Holloway et al. |
| 9,850,880 | B2 | 12/2017 | Puls |
| 10,843,907 | B2 * | 11/2020 | Lagerweij ............. E04H 12/342 |
| 11,795,038 | B2 * | 10/2023 | Gomez Mora ....... B66C 23/207 |
| 2003/0183594 | A1 | 10/2003 | Torres Martinez |
| 2011/0168654 | A1 | 7/2011 | Ahler et al. |
| 2016/0258421 | A1 | 9/2016 | Agassi |
| 2018/0155160 | A1 | 6/2018 | Nelson et al. |
| 2018/0282134 | A1 * | 10/2018 | Lagerweij ............... B66C 23/82 |
| 2019/0219035 | A1 | 7/2019 | Garcia De La Pena |
| 2019/0338757 | A1 * | 11/2019 | Helmens ................. F03D 13/10 |
| 2021/0155460 | A1 * | 5/2021 | Gomez Mora ......... B66C 23/32 |
| 2021/0270242 | A1 | 9/2021 | Garcia De La Pena Razquin |

FOREIGN PATENT DOCUMENTS

| | | | |
|---|---|---|---|
| CN | 105366566 | A | 3/2016 |
| CN | 105439005 | A | 3/2016 |
| CN | 107311051 | A | 11/2017 |
| CN | 207046724 | U | 2/2018 |
| CN | 108821133 | A | 11/2018 |
| DE | 19647515 | A1 | 5/1998 |
| DE | 19741988 | A1 | 4/1999 |
| EP | 2908000 | A2 | 8/2015 |
| EP | 3517776 | A1 | 7/2019 |
| EP | 3828121 | A1 | 6/2021 |
| ES | 2738179 | A1 | 1/2020 |
| JP | 2010235257 | A | 10/2010 |
| KR | 20060083826 | A | 7/2006 |
| NL | 1032591 | C2 | 3/2008 |
| NL | 2003170 | C2 | 1/2011 |
| NL | 2017381 | B1 | 3/2018 |
| WO | WO2012/152446 | A1 | 11/2012 |
| WO | WO2013/012761 | A2 | 1/2013 |
| WO | WO2018/132010 | A1 | 7/2018 |
| WO | WO2018/164571 | A1 | 9/2018 |

OTHER PUBLICATIONS

PCT International Search Report & Opinion Corresponding to PCT/EP2022/064168 on Aug. 17, 2022.

* cited by examiner

CRANE ASSEMBLIES AND METHODS FOR ERECTING TOWERS AND WIND TURBINES

The present application claims priority to PCT Application Number PCT/EP2022/064168, filed May 25, 2022, which claims the benefit of EP patent application 21 382 478.2 filed on May 26, 2021. Both of the applications are incorporated by reference herein in their entirety.

The present disclosure relates to crane assemblies for erecting a tower including a plurality of tower sections. And in particular, the present disclosure relates to crane assemblies for erecting a wind turbine tower. The present disclosure further relates to methods for crane assemblies climbing a tower and to methods for erecting a wind turbine tower and for installing a wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

A known way of mounting a wind turbine includes the steps of transporting the different elements to the site of the wind turbine. A wind turbine tower may typically comprise a plurality of tower sections which are mounted or stacked on top of each other. The tower sections may be joined to each other at tower flanges.

A large crane may be used to hoist subsequent tower sections and stack them on top of each other. After assembling the tower sections, the wind turbine nacelle may be lifted with the same large crane and can be mounted on top of the tower. Then the wind turbine rotor hub can be lifted with the crane and mounted to a rotor shaft and/or the nacelle.

Additionally, one or more blades are mounted to the wind turbine rotor hub. The rotor hub generally comprises a plurality of annular mounting flanges with openings. The blade can comprise a plurality of fasteners, such as bolts, or pins or studs at its blade root. During installation, these fasteners are to be fitted into the openings in the mounting flanges.

It is also known to hoist a complete rotor assembly, i.e. the hub with the plurality of blades, and mount it to e.g. the nacelle. But in order to mount a complete rotor assembly, a large surface area is required, which is typically not available e.g. in the case of offshore wind turbines.

It is further known to mount an incomplete rotor assembly on the nacelle, e.g. the hub with two blades and subsequently, mount the remaining blade. In these cases, the rotor with the two blades is normally mounted with the two blades pointing upwards, i.e. "bunny ears" configuration. There is thus no need for rotating the wind turbine rotor as the third blade could be vertically mounted from below. However, in order to be able to perform these operations, the prevailing wind speed has to be below a predetermined value for a prolonged period of time. The period of time depends on the expected length of the installation step and a safety factor to be taken into account.

It is also known to mount each of the plurality of blades in a substantially horizontal orientation or in a substantially vertical orientation. This means that individual installation steps may require less time and may be performed at higher winds, thus increasing the time windows available for installation.

Typically, to install a blade onto the wind turbine hub, the large crane previously used to install e.g. the tower, the nacelle and the rotor hub can be operated in order to raise the blade relative to the rotor hub. Unfortunately, it is expensive to operate such large cranes. In fact, the costs of employing such large cranes currently accounts for a significant portion of the overall costs associated with wind turbine installations. For offshore applications, special vessels carrying large cranes are required.

There is a clear tendency in the field to increase the size of the wind turbines. The wind turbine towers are built increasingly higher and the blades become increasingly longer. E.g. current tower designs are over 80 m, 100 m or even over 120 meters high. The weight of wind turbine components such as blades, nacelle, and rotor hub increases as well with an increase in size.

In order to mount tower sections on top of each other, and subsequently hoist a nacelle etc. ever larger cranes are required. Moreover, increasing counterweights are required for these large cranes.

There is a plurality of disadvantages related to the use of large cranes. Platform or pads for the cranes increase with an increase in size of the cranes. Transportation of crane components becomes increasingly complex and expensive. And large cranes are more sensitive to wind loads as well.

In view of these disadvantages, self-hoisting or climbing cranes have been proposed. Such climbing cranes offer several potential advantages including e.g. easier transportation of the crane, and regardless of the height of the tower the length of the crane does not need to be increased. The hoisting structure attached to a tower will also be less sensitive to wind loads. Also, using such self-hoisting or climbing cranes, the surface area required for installation stays substantially the same regardless of the height of the tower.

WO 2018/132010 discloses a method for onshore or offshore erecting an upstanding construction comprising longitudinal construction parts, in particular parts of a windmill. In this prior art document, each of the tower sections carries a guide facility which is depicted as rails. A crane can be guided along the rails.

US 2018/0282134 discloses a hoisting system for the installation of a wind turbine wherein said hoisting system comprises measures to achieve a load bearing connection to the tower of the wind turbine and comprises measures to move the hoisting system up and down along the tower wherein the hoisting system, when it is fixed to an already installed part of the wind turbine tower with said load bearing connection, is arranged to install or remove any of a tower section, a nacelle, a generator, a hub, and a blade in one or more combined hoists or in a single hoist.

Examples of the present disclosure provide methods and systems for erecting a tower, and particularly high wind turbine towers with long and heavy tower sections. Examples of the present disclosure provide methods and systems for erecting wind turbines which reduce bending loads in the crane assemblies.

SUMMARY

In an aspect of the present disclosure, a crane assembly for erecting a tower including a plurality of tower sections is provided. The crane assembly comprises a first telescopic mast and a second telescopic mast connected to the first telescopic mast and crane mounted on top of the first telescopic mast and comprising lifting equipment. The first telescopic mast is configured to change a length of the first telescopic mast, and comprises a first clamp assembly for selectively gripping portions of the tower. The second telescopic mast is configured to change a length of the second telescopic mast and comprising a second clamp assembly for selectively gripping portions of the tower. The first telescopic mast is configured to increase its length from a retracted state in a first direction, and the second telescopic mast is configured to increase its length from a retracted state in a second direction, the second direction being opposite to the first.

In accordance with this aspect, a crane assembly is provided which is suitable for lifting relatively heavy and large components such as tower sections. The crane assembly according to this aspect comprises two telescopic masts which can extend in opposite directions. By selectively releasing the clamp assemblies of these telescopic masts and changing the lengths of the telescopic masts, the crane assembly can climb the tower. Moreover, the clamp assemblies may be suitably positioned at the moment of lifting tower sections to reduce loads in the crane assembly.

In a further aspect, a method for climbing a tower with a crane assembly is provided. The method comprises positioning a first tower section and attaching a crane assembly to the first tower section, the crane assembly comprising a telescopic mast and a crane mounted on top of the telescopic mast. The method further comprises stacking one or more further tower sections on top of the first tower section using the crane assembly and the crane assembly climbing the further tower sections by releasing a top clamp assembly of an upper telescopic mast and extending the upper telescopic mast and releasing a bottom clamp assembly of a lower telescopic mast and retracting the lower telescopic mast.

In yet a further aspect, a climbing crane assembly for use with a wind turbine tower is provided, which comprises a lower telescopic mast comprising a lower clamp assembly, an upper telescopic mast comprising an upper clamp assembly and mounted on top of the lower telescopic mast and a crane mounted on top of the upper telescopic mast and comprising lifting equipment. The lower telescopic mast is configured to increase its length by telescopically extending in a downwards direction, and the upper telescopic mast is configured to increase is length by telescopically extending in an upwards direction.

DETAILED DESCRIPTION OF EXAMPLES

Figure 1:
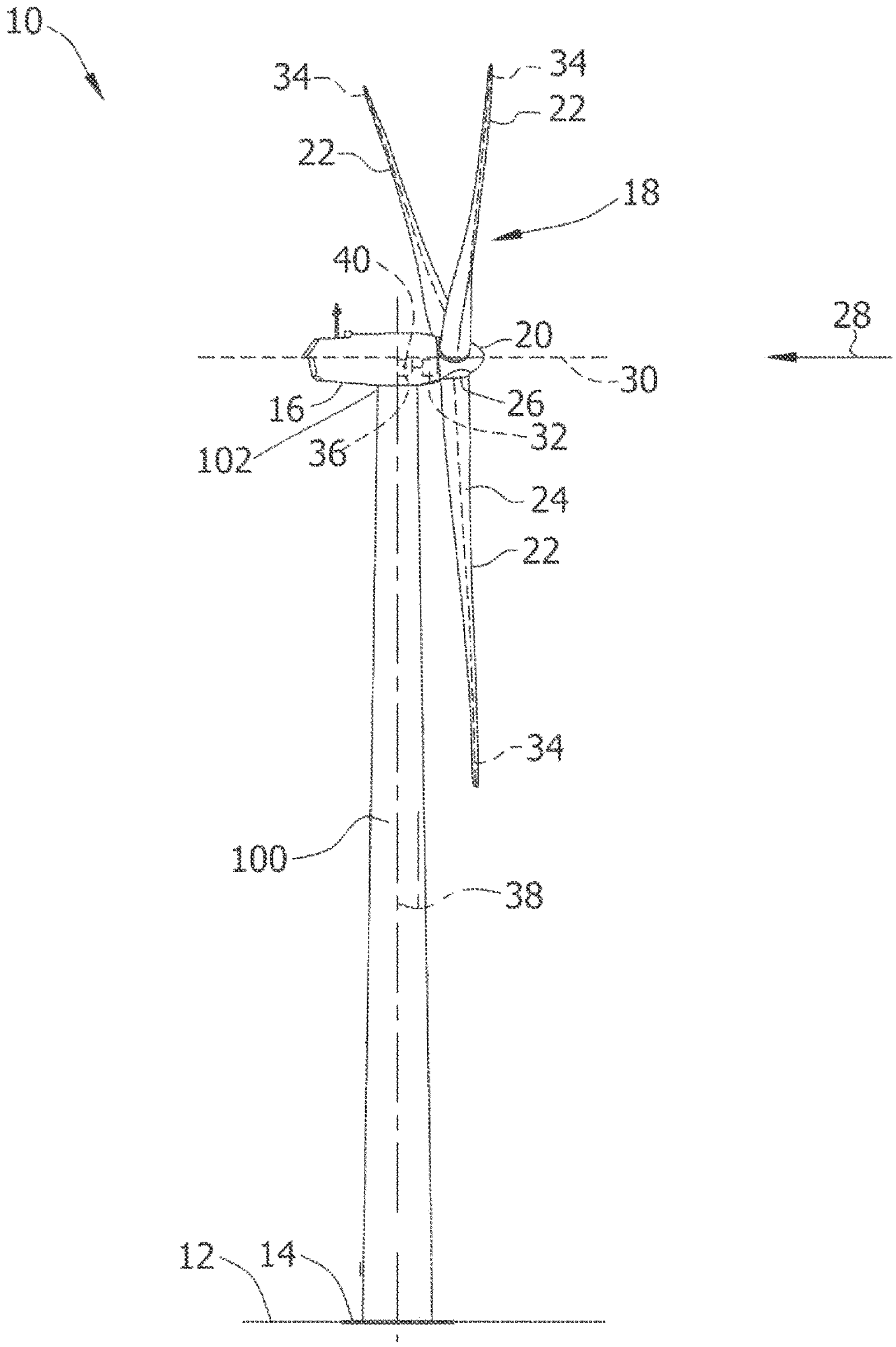
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced on the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
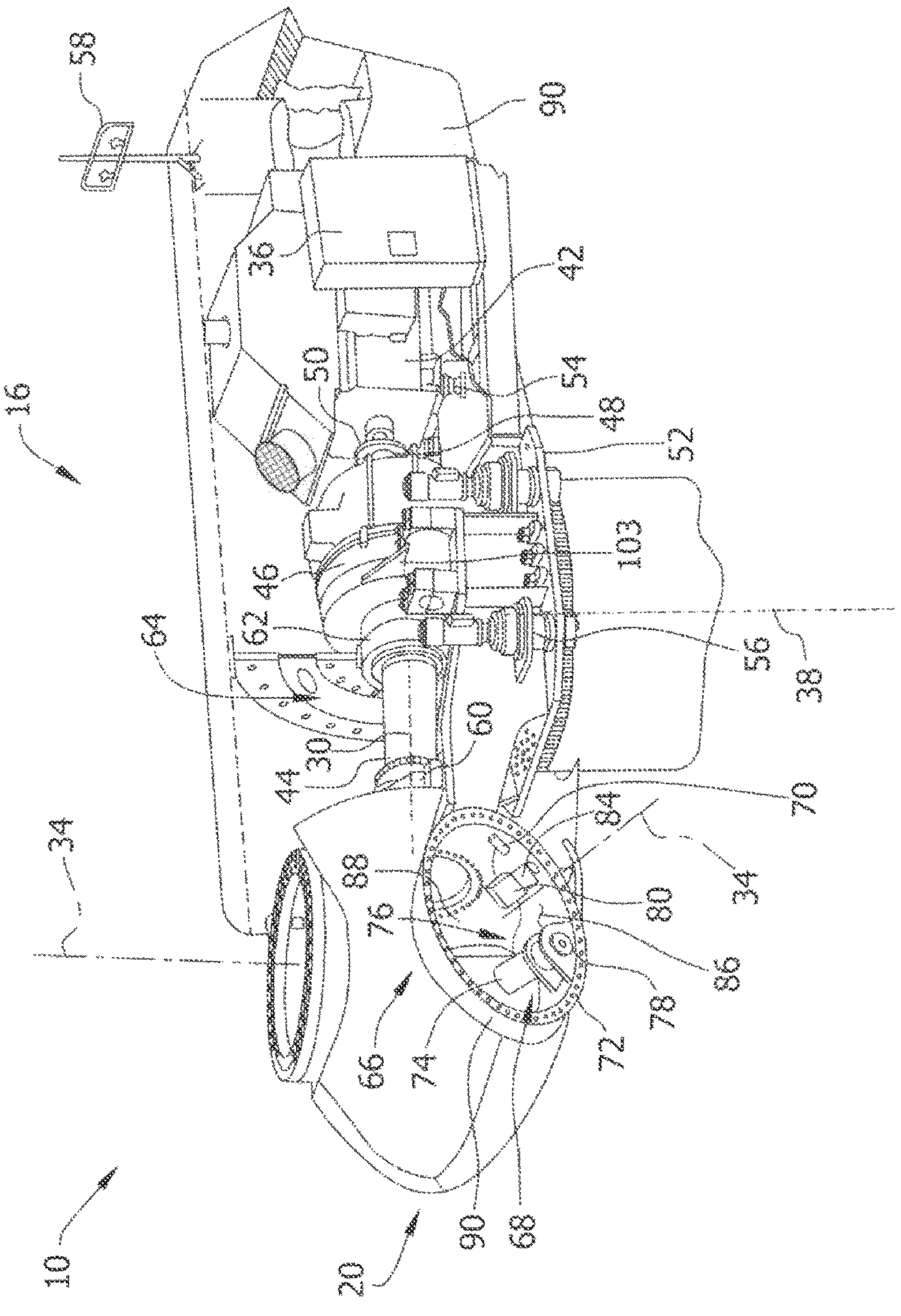
FIG. 2 illustrates a simplified, internal view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 4:
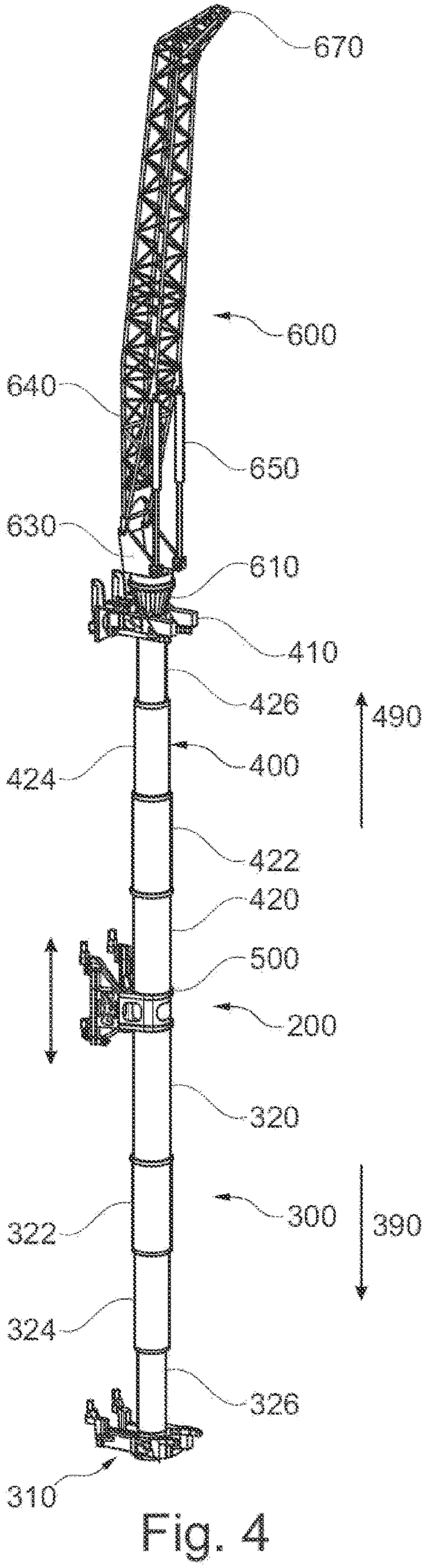
FIG. 4 schematically illustrates an example of a crane assembly.

FIG. 4 schematically illustrates an example of a crane assembly in accordance with the present disclosure. The crane assembly 200 for erecting a tower including a plurality of tower sections, comprises a first telescopic mast 400, a second telescopic mast 300 and a crane 600 mounted on top of the first telescopic mast and comprising lifting equipment. The first telescopic mast 400 is configured to change a length of the first telescopic mast 400, and comprises a first clamp assembly 410 for selectively gripping portions of the tower. The second telescopic mast 300 is configured to change a length of the second telescopic mast 300 and comprises a second clamp assembly 310 for selectively gripping portions of the tower. The first telescopic mast 400 is configured to increase its length from a retracted state in a first direction 490, and the second telescopic mast 300 is configured to increase its length from a retracted state in a second direction 390. The second direction 390 is opposite to the first direction 490.

In examples, the crane assembly 200 is configured to climb the tower by selectively releasing the first or second clamp assembly 310, 410 and changing the length of the first and/or second telescopic masts 300, 400.

In the example of FIG. 4, the first telescopic mast 400 comprises a first base 420, and the second telescopic mast 300 comprises a second base 320, and wherein the first base 420 is mounted on top of the second base 320. The first base 420 may be bolted or otherwise attached to the second base 320.

The first base 420 and second base 320 together may form a central mast segment. The length of the telescopic mast can thus be extended in two opposite directions, i.e. the first direction 490 when the first telescopic mast 300 is changed from a retracted state to a more extended state and in the second direction 390 when the second telescopic mast 400 is changed from a retracted state to a more extended state. Similarly the length of the telescopic mast can thus be shorted by returning the first and/or second telescopic mast 300, 400 to a more retracted state.

In the example of FIG. 4, the first telescopic mast 400 is configured to increase its length in an upwards direction 490, and the second telescopic mast 300 is configured to increase its length in a downwards direction 390.

The crane assembly 200 may further comprise a central clamp assembly 500 arranged with the first or the second base 320, 420. The central clamp assembly 500 may be arranged centrally between the first and second telescopic masts. The telescopic masts can change their length and move the upper clamp assembly 410 and the lower clamp assembly 310 upwards and downwards. An aspect of this example is that the central clamp assembly 500 may be arranged centrally between the upper and lower clamp assemblies 310, 410 at different stages of the tower construction. This can allow heavy and long parts (e.g. tower sections) to be handled while maintaining bending loads in the crane assembly in an acceptable range.

In examples, the central clamp assembly 500 may be arranged to be displaceable along the first base 420 and the second base 320. This aspect makes the crane assembly 200 more versatile and flexible, and allows suitably positioning the central clamp assembly 500 in different steps of the erection of a tower and installation of a wind turbine tower.

The central clamp assembly may be slidably arranged with respect to the first 420 and/or the second base 320. Any suitable mechanism involving e.g. guides, rails, a rack and pinion mechanism, may be used to move the central clamp assembly with respect to the first 420 and/or the second base 320.

As shown in FIG. 4, the first telescopic mast 400 may further comprise one or more additional mast segments 422, 424, 426, which are slidable with respect to the first base 420. Similarly, the second telescopic mast 300 may also comprise one or more additional mast segments, 322, 324, 326 which are slidable with respect to the second base 320.

A mechanism of increasing the length (by changing from a retracted state to a more extended state) and shortening the length (by changing from an extended state to a more retracted state) of the first and/or second telescopic masts may be e.g. hydraulic, or pneumatic. In each of the first and second telescopic masts, one or more hydraulic pistons or pneumatic pistons may be arranged.

The additional mast segments 422, 424, 426 (and 322, 324, 326) include one or more intermediate segments 422, 424 (and 322, 324), and a most distal segment 426 (326) that is arranged further away from the base 420 (320) than the intermediate segments 422, 424 (and 322, 324), and the most distal segment 426 (326) includes the first clamp assembly 410. The upper mast segment 400 includes an upper most segment 426 comprising the upper clamp assembly 410. The lower mast segment 300 includes a lower most segment 326 comprising the lower clamp assembly.

The first clamp assembly 410 may be arranged at or near a distal end of the most distal segment 426. Similarly, the second clamp assembly 310 may be arranged at or neat a distal end of the most distal segment 326.

The crane 600 may be arranged on top of the most distal (most upper) segment 426. A transition piece 610 of the crane may be bolted or otherwise attached to the distal end of segment 426. The transition piece 610 forms a connecting piece between the telescopic mast(s) and the crane. A base (illustrated further in FIG. 6) may be rotatably mounted on transition piece 610. The base may comprise a frame 630 carrying a pneumatic or hydraulic mechanism 650 to change an orientation of boom 640 of the crane 600. The boom 640 may be formed as a truss structure. At a most distal end 670 of boom 640, lifting equipment (not further illustrated) may be arranged. The lifting equipment may include cables, ropes, pulleys, hooks and/or other suitable equipment.

FIGS. 5A-5D schematically illustrate details of an example of a crane assembly 200 attached to a tower comprising multiple tower sections, and more particularly of a second clamp assembly 310, that is, in the example of FIG. 4, the lower clamp assembly 310 of the lower telescopic mast 300. The lower clamp assembly 310 is arranged at or near a distal end (lower most end) of the distal most segment (lower most segment) 326.

The tower may comprise a first tower section 120 and a second tower section 130 mounted on top of the first tower section 120. The first tower section 120 and the second tower section 130 are attached at mounting flanges at a junction 125 between the tower sections.

Figure 5B:
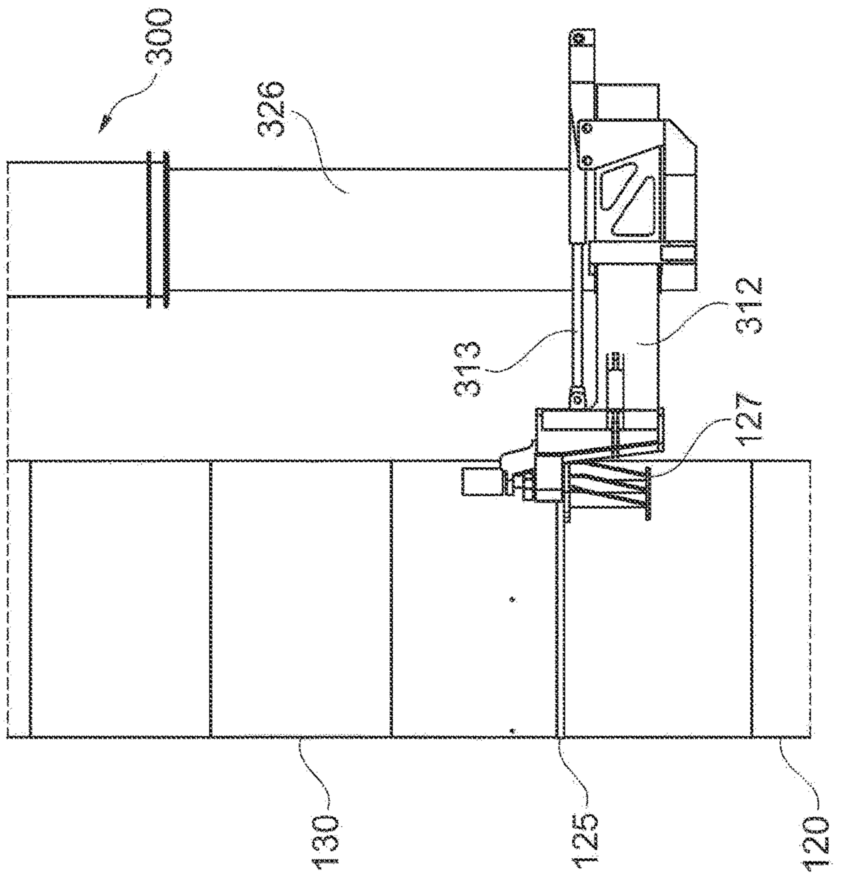
FIGS. 5A-5D schematically illustrate details of the lower telescopic mast of a crane assembly.
Figure 5A:
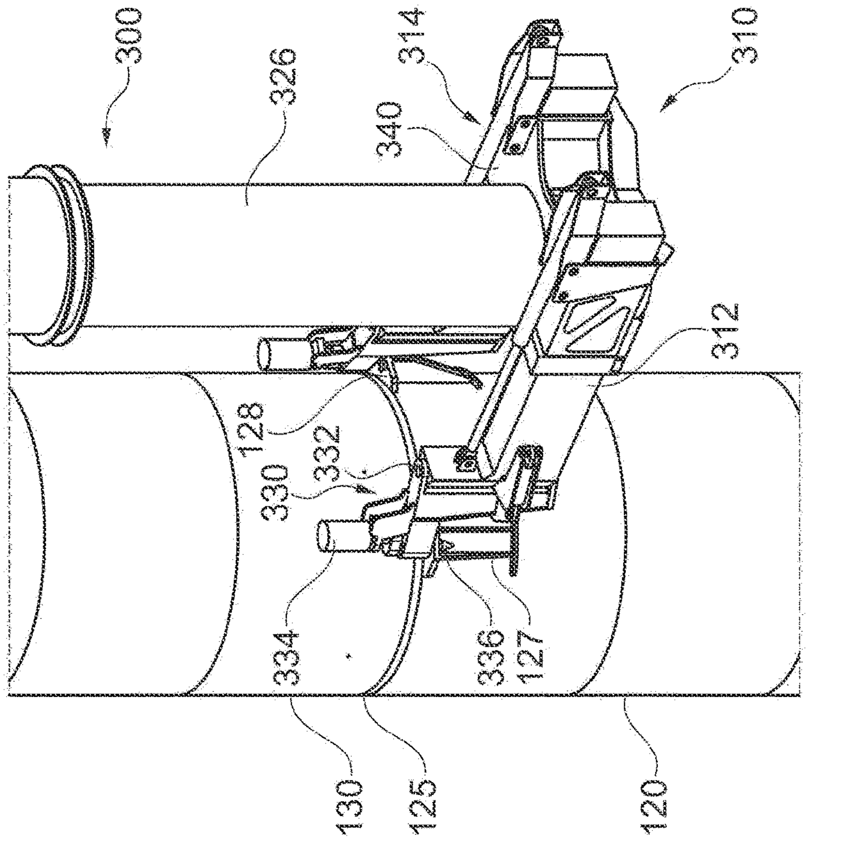
Figure 5D:
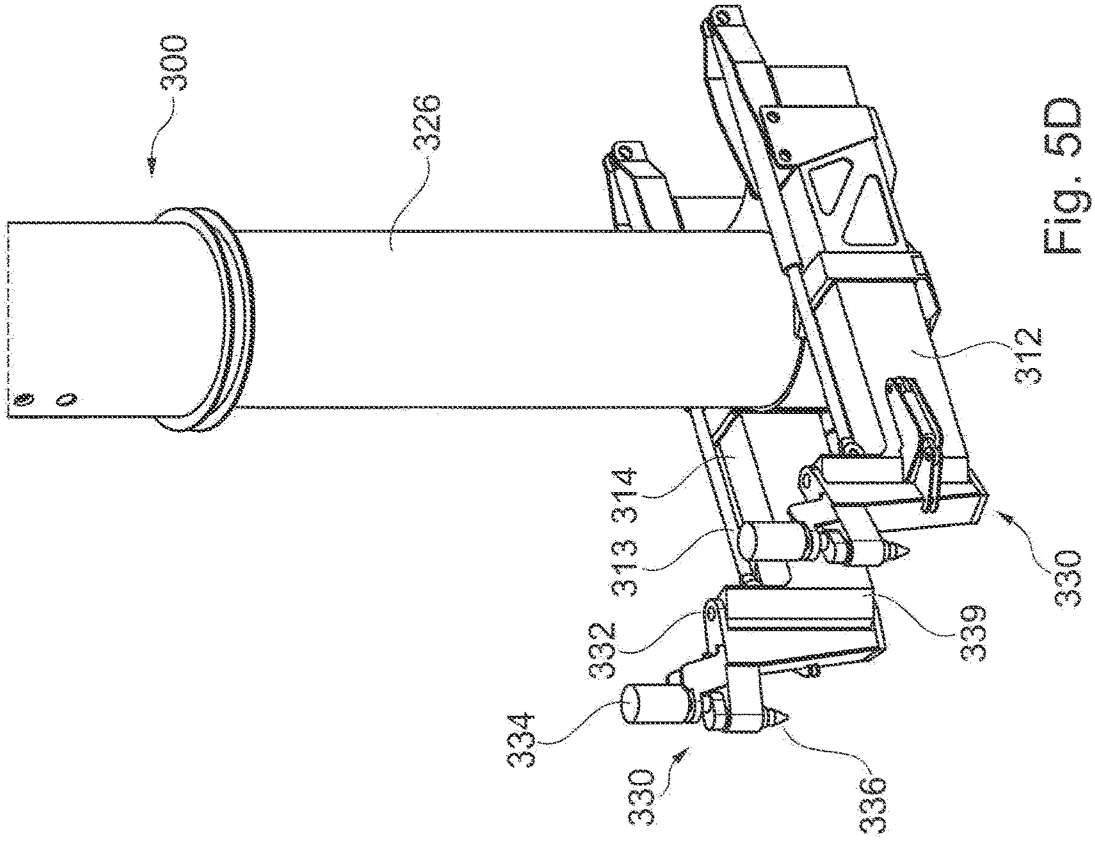
Figure 5C:
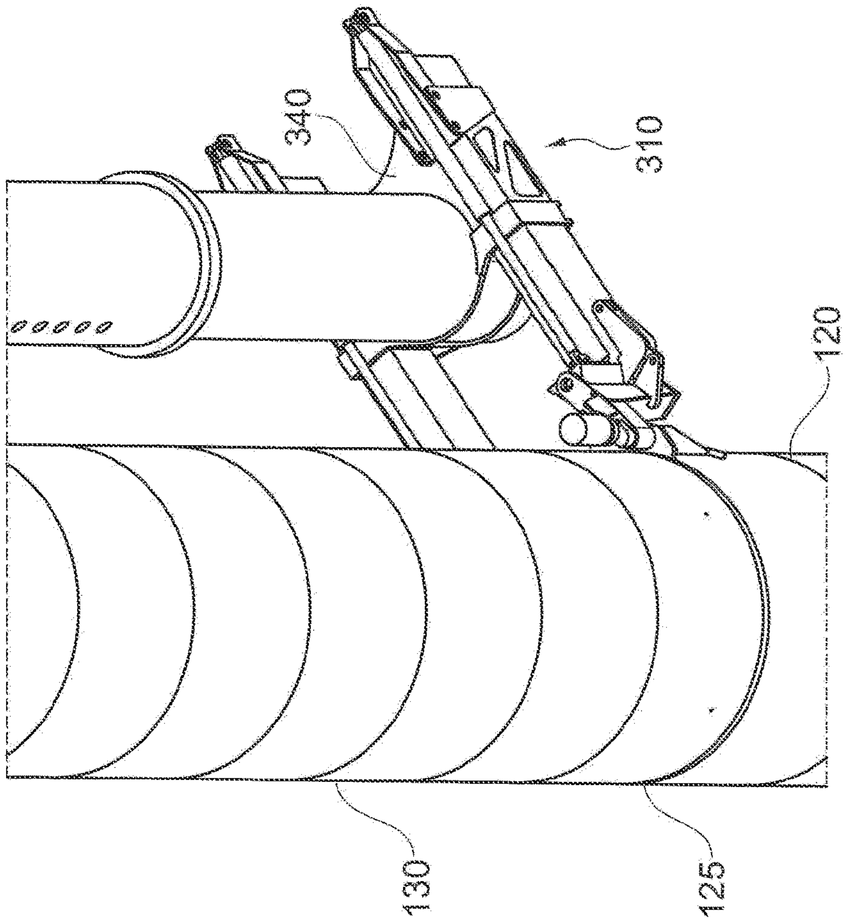

In the situation of FIGS. 5A-5C, the lower clamp assembly 310 is attached to pads 127. The pads 127 in this example are arranged near a top end of first tower section 120. In further examples, pads 127 may be arranged at or near a bottom end of tower sections.

The pads may be attached to or integrally formed with an outer wall of the tower section. The pads may include stiffeners supporting a substantially flat flange. The flat flange may include one or more holes 128 which can receive parts 336 of the clamping assembly for attaching and clamping the pads.

In examples, the second clamp assembly 310 comprises a first arm 312 including a first clamp 330 arranged at a distal end of the first arm 312, and a second arm 314 including a second clamp 330 arranged at a distal end of the second arm 314. The first and the second arms 312, 314 may be telescopic arms. The first clamp assembly 410 at a distal end of the first telescopic mast (upper telescopic mast) may have a similar structure.

The first and/or the second clamp assembly 310, 410 may be configured to change a distance between the first arm 312 and the second arm 314 such that the clamp assembly can grab (and release) pads of different tower sections. The different tower sections may have varying dimensions and in particular tower sections may be conical. In the example of FIGS. 5A-5D, the arms 312, 314 may have a hydraulic mechanism 313 to extend the arms and retract the arms.

The clamps 330 may be rotatably mounted with respect to the first and second arms 312, 314. The clamps may be rotated around axis 332. Clamps 330 may be hingedly mounted to column 339. Rotation around axis 332 is one way in which a distance between clamps 330 of first and second arms 312, 314 may be adjusted to adapt to changing distances between pads 127 on different towers and/or different tower sections.

The clamps 330 may comprise an engagement feature 336 which engages with the pad 127, and in this particular example may be received in hole 128 of pad 127. The coupling of the clamps to the pads may be a male-female coupling. By receiving engagement feature 336 in holes 128 the clamp may be securely fixed to the tower section. When such feature 336 is extracted, the clamp is released, and the corresponding telescopic mast segment may be moved upwards or downwards. The clamps 330 may be selectively activated and released using hydraulic mechanism 334.

As may be seen in FIG. 5C, the lower clamp assembly 310 may include a central base 340 fitted around telescopic mast segment 326. The central base may be welded to the telescopic mast segment. Other attachments may also be used.

Figure 6A:
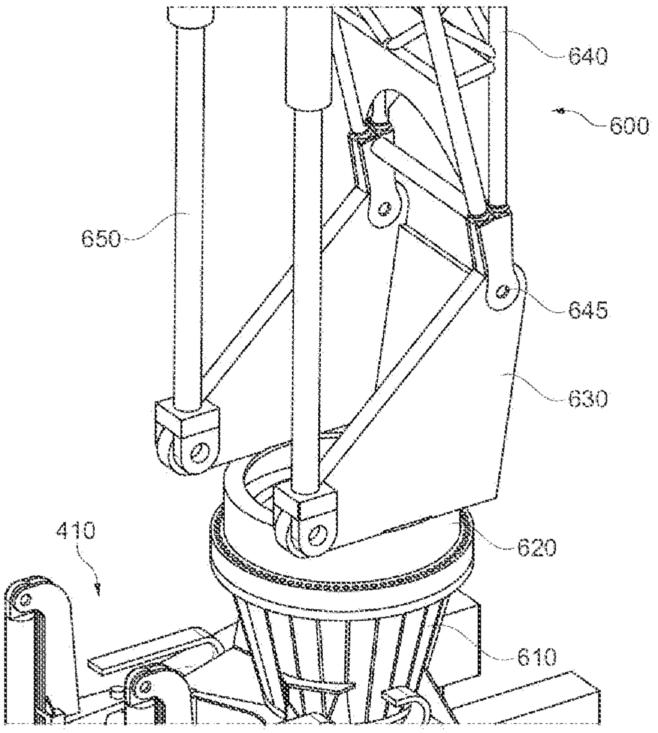
FIGS. 6A-6B schematically illustrates a crane and an upper clamp assembly of the crane assembly of FIG. 4.
Figure 6B:
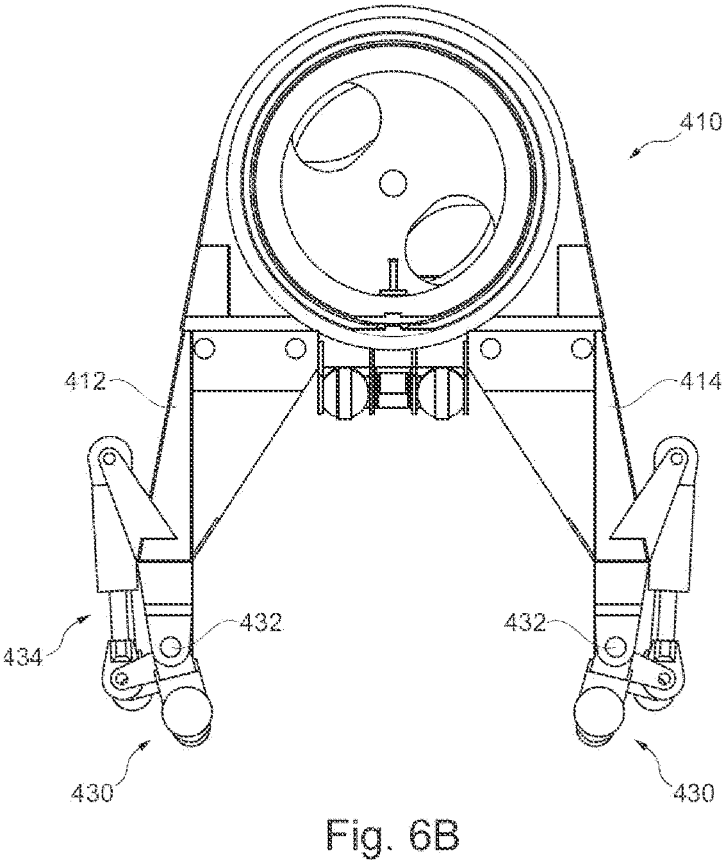

FIGS. 6A and 6B schematically illustrate details of crane 600 mounted on the upper telescopic mast 400, and of upper clamp assembly 410 which may be arranged at or near a distal end of upper most segment 426 of the upper telescopic mast 400.

The transition piece 610 may be partially conical or frustoconical. A lower end of transition piece 610 may be attached to an upper most segment 426 of the upper telescopic mast. The upper end may have increased dimensions, or an increased diameter compared to the lower end of the transition piece 610. At the upper end of transition piece 610, base plate 620 of crane 600 may be mounted. The base plate 620 may be rotatably mounted on transition piece 610 with e.g. a roller element bearing.

Frame 630 is mounted on base plate 620. Hydraulic pistons 650 may change the orientation of boom 640 of crane 600. By extending the hydraulic pistons 650, the boom 640 may be positioned more vertically. By retracting the hydraulic pistons 650, the boom may be positioned more horizontally and less vertically.

Boom 640 may be formed as a truss structure. And boom 640 may be rotated about axis 645 to change to a more horizontal or a more vertical position. In order to hoist tower sections, or other wind turbine parts and components, the base plate 620 may be rotated such that the boom points away from the tower. The hydraulic pistons 650 may be adapted to rotate the boom 640 to a more horizontal position, such that distal end 670 of crane 600 is further away from the (partially constructed) tower. Lifting equipment arranged with the distal end 670 of the crane may be used for hoisting a wind turbine component. Once hoisted to the top of the tower, the boom may be rotated towards a more vertical position, and the base plate 620 may then be rotated such that the component (tower section or other) may be mounted.

The upper clamp assembly 410 is illustrated in FIG. 6B. The upper clamp assembly 410 may generally be similar in terms of functionality and structure to the lower clamp assembly 310 illustrated in FIGS. 5A-5D.

The upper clamp assembly 410 may have a first arm 412, and a second arm 414. The length of the arms may be adapted, e.g. the arms 412, 414 may be telescopic. The length of the arms may be regulated using e.g. a hydraulic or pneumatic mechanism. At the distal ends of the arms 412, 414, clamps 430 are arranged. Similarly to what was shown in FIGS. 5A-5D, the clamps 430 may be hingedly mounted and may be rotatable about vertical axis 432. A hydraulic mechanism 434 may be provided to control positions of the clamps. As illustrated with respect to the lower clamp assembly, a hydraulic (or pneumatic) mechanism may be used for activating and releasing clamps 430.

Figure 7A:
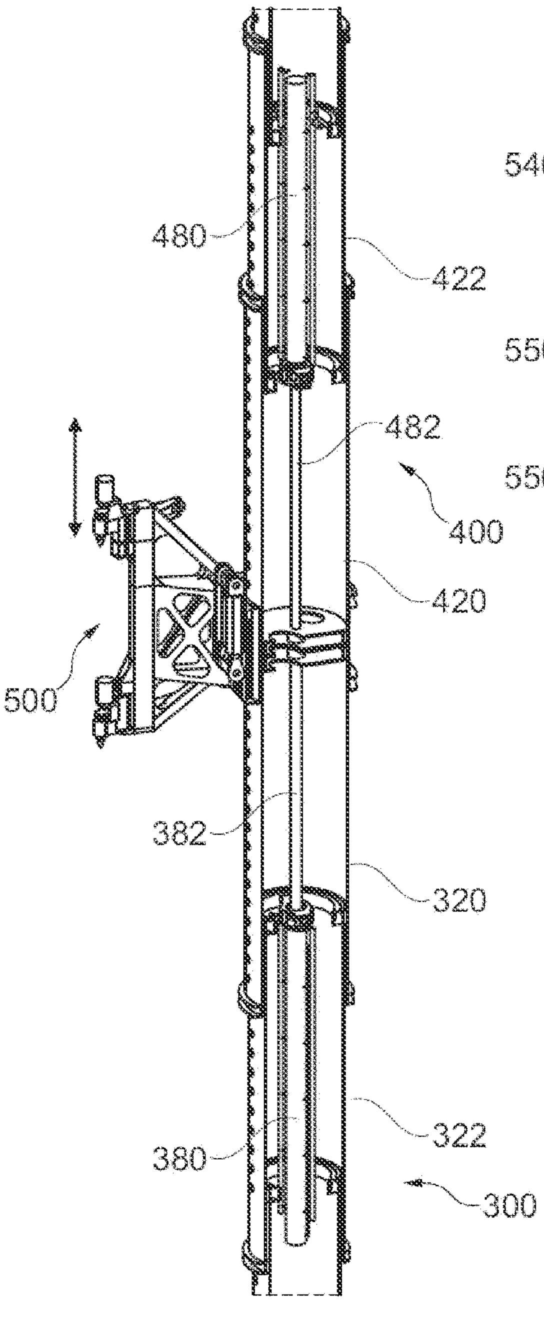
FIGS. 7A-7B schematically illustrates details of telescopic mast segments of the crane assembly of FIG. 4.
Figure 7B:
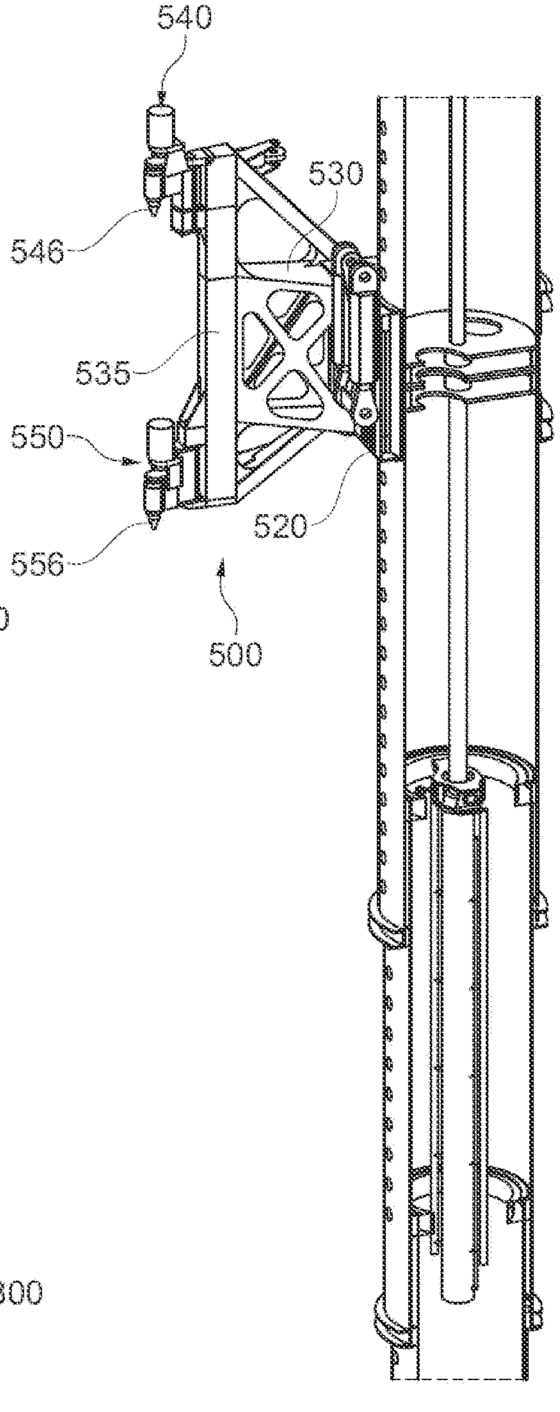

FIGS. 7A and 7B schematically illustrate a central clamp assembly 500 of the example of crane assembly 200. The central clamp assembly 500 may include two sets of "central clamps", 540, 550. The two sets of central clamps include two upper (central) clamps 540 and two lower (central) clamps 550. FIGS. 7A and 7B illustrate a longitudinal cross-sectional view and therefore only show a single upper clamp 540 and a single lower clamp 550.

Upper clamps 540 and lower clamps 550 may be used for selectively gripping portions of a tower, and more particularly to selectively clamp and release pads 127 arranged at different heights of the tower. The clamps 540, 550 are generally similar to the clamps of the upper and lower clamp assemblies. The mechanism and coupling of the clamps may be similar since they are configured to grip the same pads 127 as the lower and upper clamp assemblies. The upper and lower clamps 540, 550 of the central clamp assembly 500 may therefore comprise engagement features 546 and 556 respectively which are configured to engage with the same holes on pads along the tower. These engagement features 546, 556 may therefore be similarly sized and shaped and work in the same manner as engagement features 337 described hereinbefore with reference to FIG. 5.

The central clamp assembly 500 may comprise a central ring 520 which is configured to be fitted around a base 420 of the first (upper) telescopic mast segment and/or a base 310 of the second (lower) telescopic mast segment. The central clamp assembly 500 may further include a frame 530 attached to central ring 520 and extending radially away from the telescopic mast segments. Frame 530 may include a truss structure and a column 535. The clamps 540, 550 may be rotatably mounted around vertical axes in a similar manner as described before.

The central clamp assembly 500 may be configured to be displaced along a height of the second base 420, and/or the first base 320. The second base and first base 320 may have the same diameter, and the central clamp assembly 500 may be slidably arranged along an outside of the first and second base 420, 320.

A distance between upper clamps 540 and lower clamps 550 may be different from the distance between the clamps 430 of the upper clamp assembly 410 and of the clamps 330 of the lower clamp assembly 310. In particular, the distance between clamps 540, 550 may be smaller than the distance between the clamps 330 and 430. In use, the clamps of the central clamp assembly may be arranged "within" the clamps 330, or 430. When clamps 430 grip pads 127 at a given height, the upper clamps 540 of central clamp assembly may be moved upwards and may then be clamped to the same pads e.g. using holes 128 which are arranged closer to each other than holes occupied by clamps 430. Then, the upper clamps may be released, and the upper telescopic mast may be moved further upwards for a next step in the construction or erection of the tower or a wind turbine. Similarly, the central clamp assembly 500 in use may be lowered to clamp pads 127 which are gripped by lower clamps 330. After securing the pads 127 with the central clamp assembly, the lower clamp assembly may be released, and the lower telescopic mast may be extended downwards, e.g. in a descending operation after completion of the tower.

As schematically illustrated, the telescopic mast segments 300, 400 may include one or more hydraulic cylinders 380, 480 and pistons 382, 482 to change the length of the telescopic mast segments.

In an aspect of the present disclosure, a climbing crane assembly for use with a wind turbine tower is thus provided. The climbing (or "self-hoisting") crane assembly comprises a lower telescopic mast comprising a lower clamp assembly, an upper telescopic mast comprising an upper clamp assembly and mounted on top of the lower telescopic mast and a crane mounted on top of the upper telescopic mast and comprising lifting equipment. The lower telescopic mast is configured to increase its length by telescopically extending in a downwards direction, and the upper telescopic mast is configured to increase is length by telescopically extending in an upwards direction.

The climbing crane assembly may further comprise a central clamp assembly. And the central clamp assembly may be displaceable along the lower telescopic mast and the upper telescopic mast.

The climbing crane assembly may comprise a first set of central clamps, and a second set of central clamps, the first set of central clamps being arranged at a different vertical position than the second set of central clamps.

The crane may be rotatably mounted with respect to the upper telescopic mast.

With examples of the climbing crane assemblies as described herein, a method according to a further aspect of the present disclosure is enabled. In a further aspect, the present disclosure provides a method for climbing a tower 100 with a crane assembly 200. The method comprises positioning a first tower section 120 and attaching a crane assembly 200 to the first tower section 120. The crane assembly 200 comprises a telescopic mast and a crane 600 mounted on top of the telescopic mast. The method further comprises stacking one or more further tower sections 130 (and other). on top of the first tower section 120 using the crane assembly 200. And the method further comprises the crane assembly 200 climbing the further tower sections 130 (and other) by releasing a top clamp assembly 410 of an upper telescopic mast 400 and extending the upper telescopic mast 400 and releasing a bottom clamp assembly 310 of a lower telescopic mast 300 and retracting the lower telescopic mast 300.

The crane assembly 200 climbing the tower may further comprise releasing a central clamp assembly 550, displacing the central clamps assembly 550 upwards relative to the upper telescopic mast 400 and/or the lower telescopic mast 300 and gripping a portion 127 of the tower 100 with the central clamp assembly 550.

The methods may further comprise hoisting a tower section 130 (and other) while the central clamp assembly 550 grips a portion 127 of the tower 100 and is positioned substantially at a same distance from the lower clamp assembly 310 and the top clamp assembly 410.

Figure 3C:
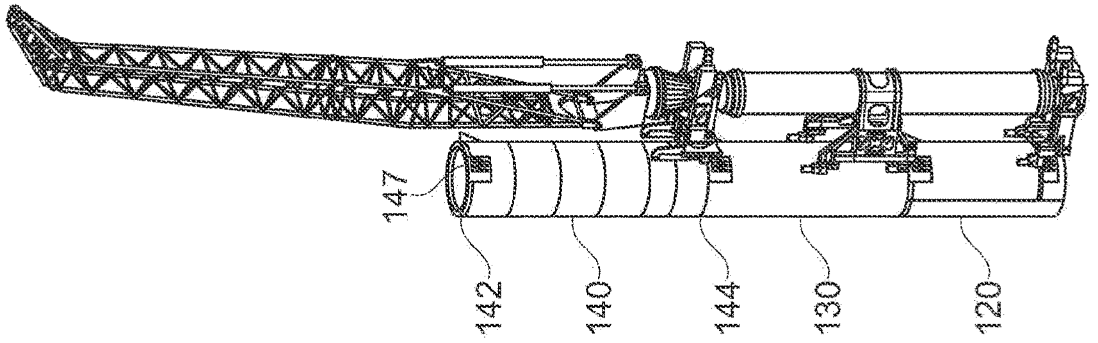
FIGS. 3A-3U schematically illustrates a sequence of steps in a method for erecting a tower and a wind turbine.
Figure 3B:
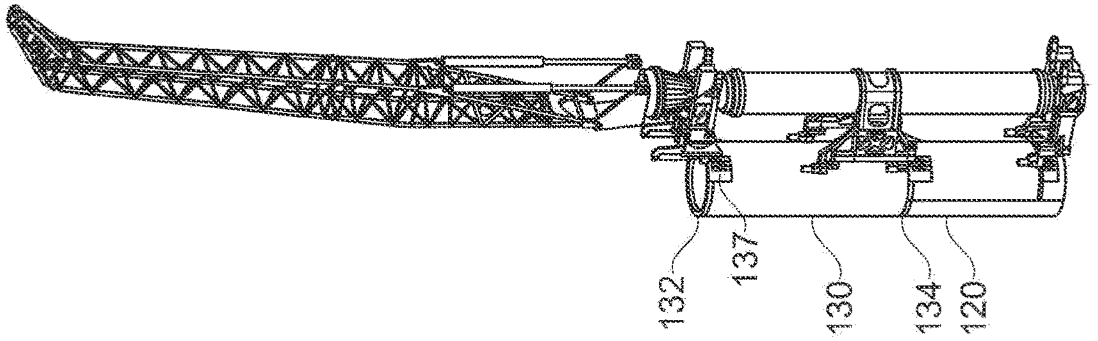
Figure 3A:
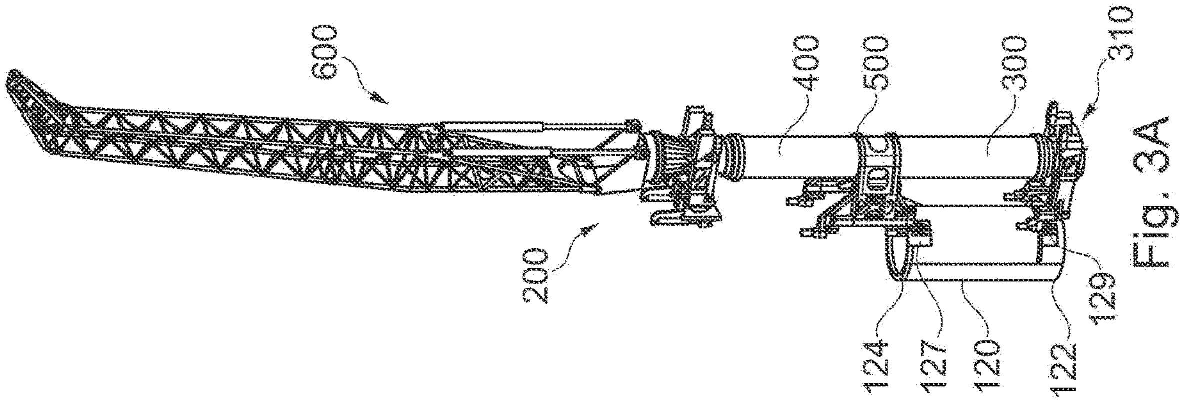
Figure 3F:
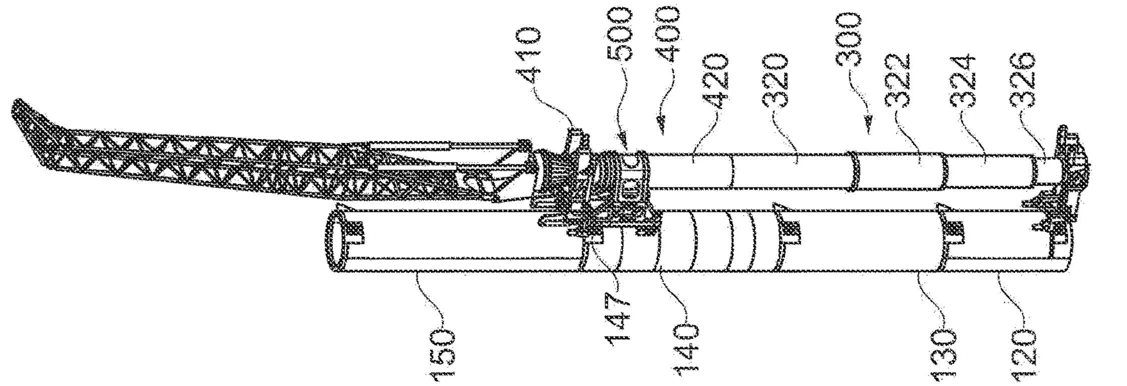
Figure 3E:
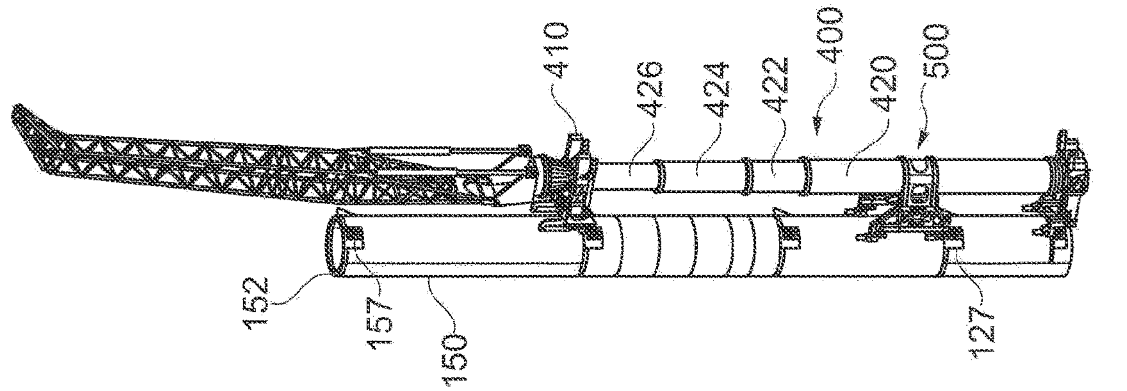
Figure 3D:
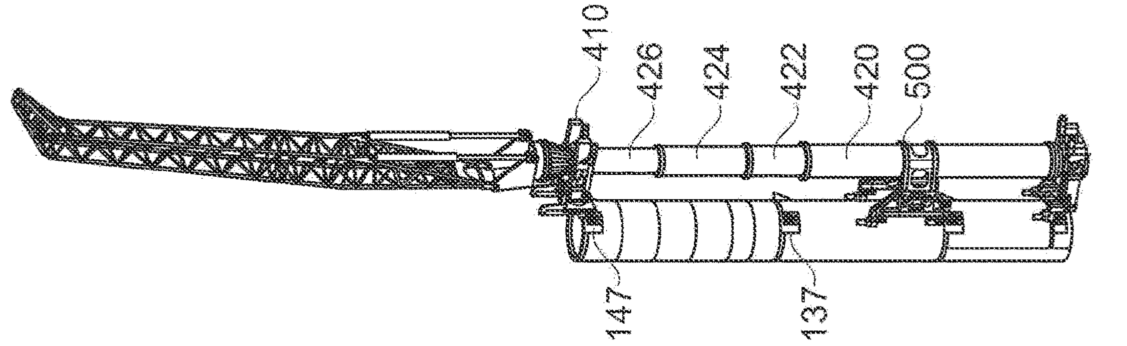
Figure 3I:
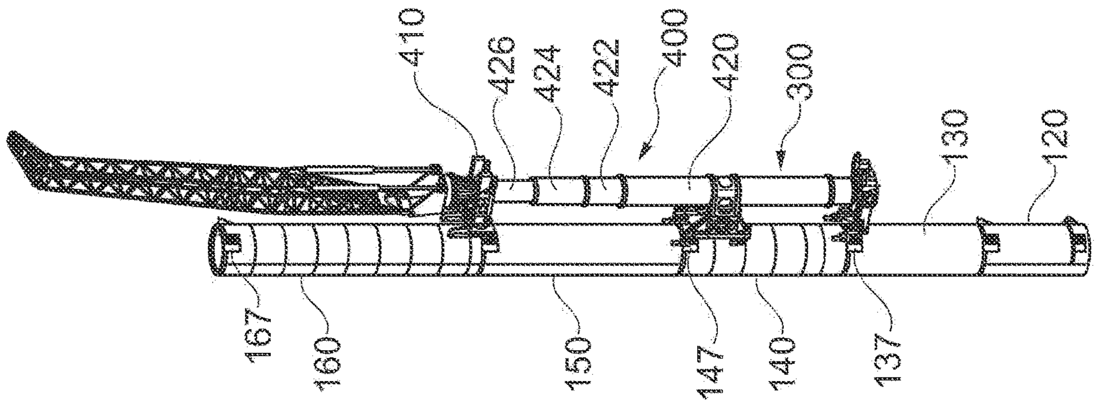
Figure 3H:
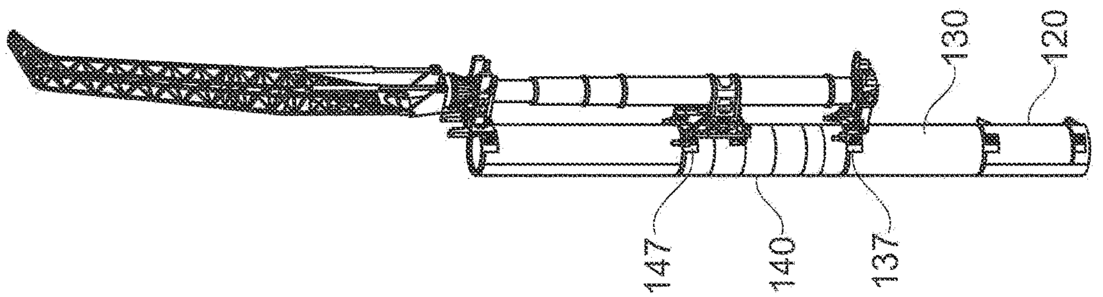
Figure 3G:
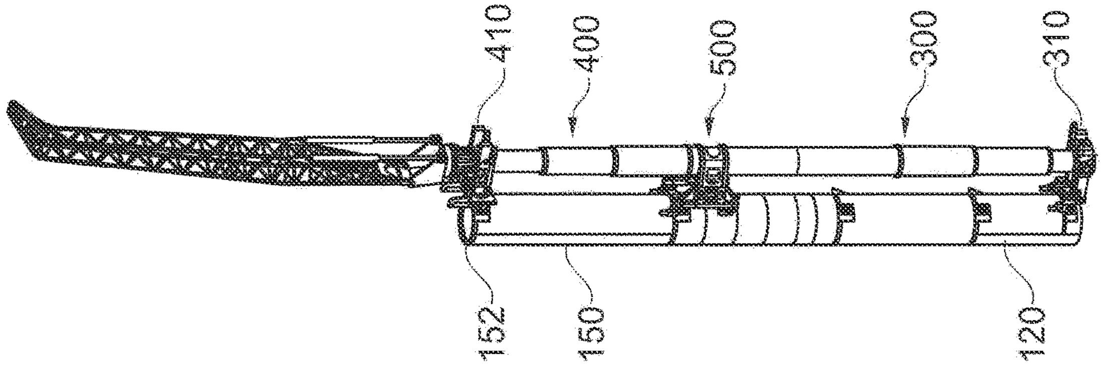
Figure 3N:
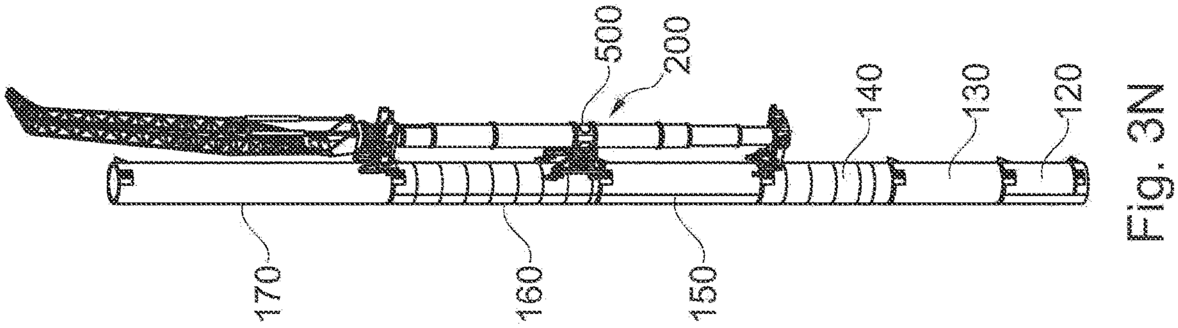
Figure 3M:
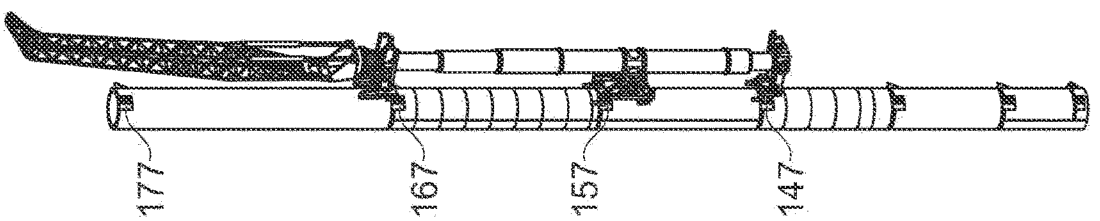
Figure 3L:
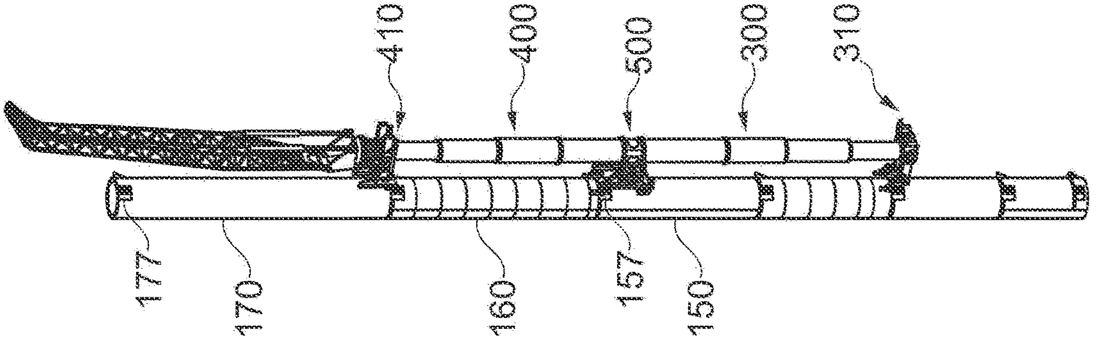
Figure 3K:
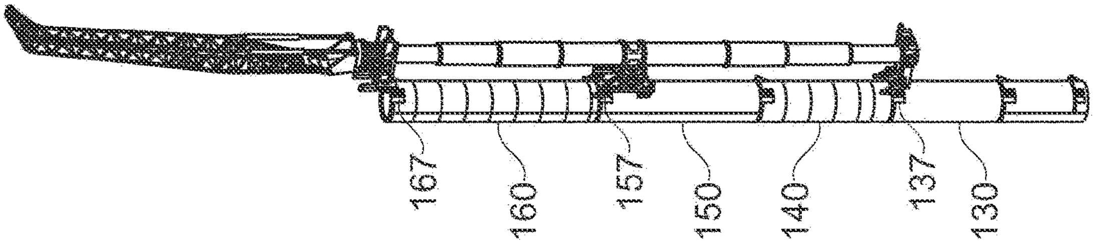
Figure 3T:
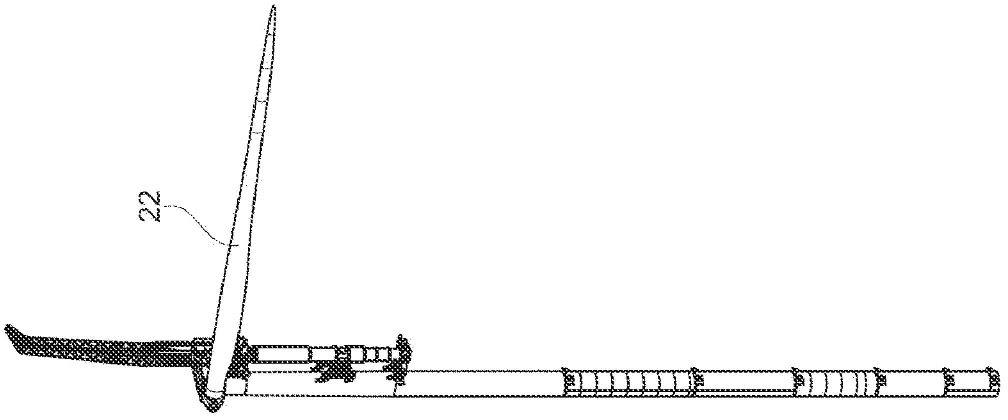
Figure 3S:
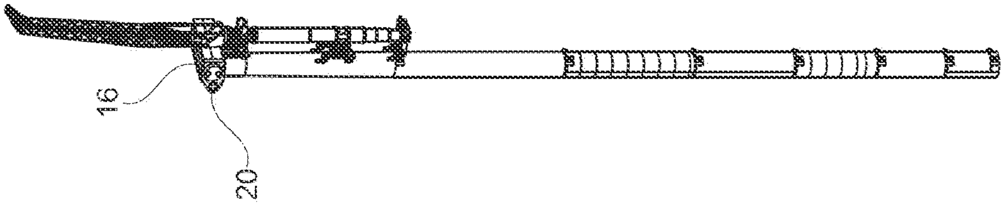
Figure 3R:
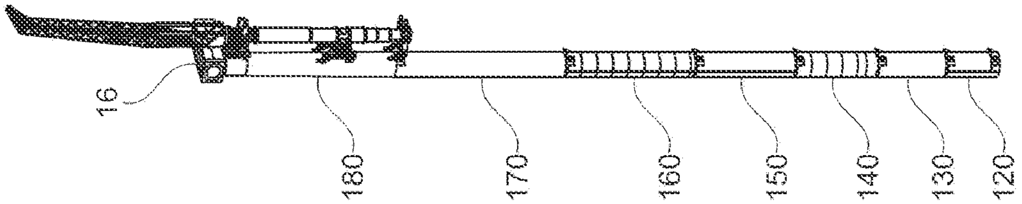
Figure 3Q:
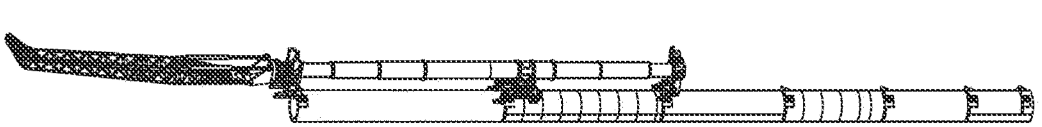
Figure 3P:
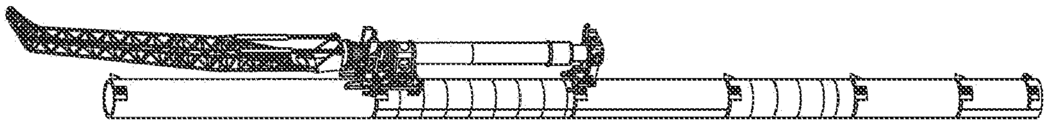
Figure 3O:
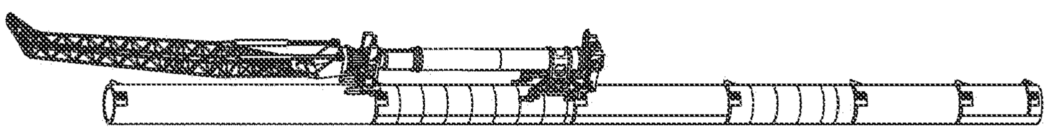
Figure 3U:
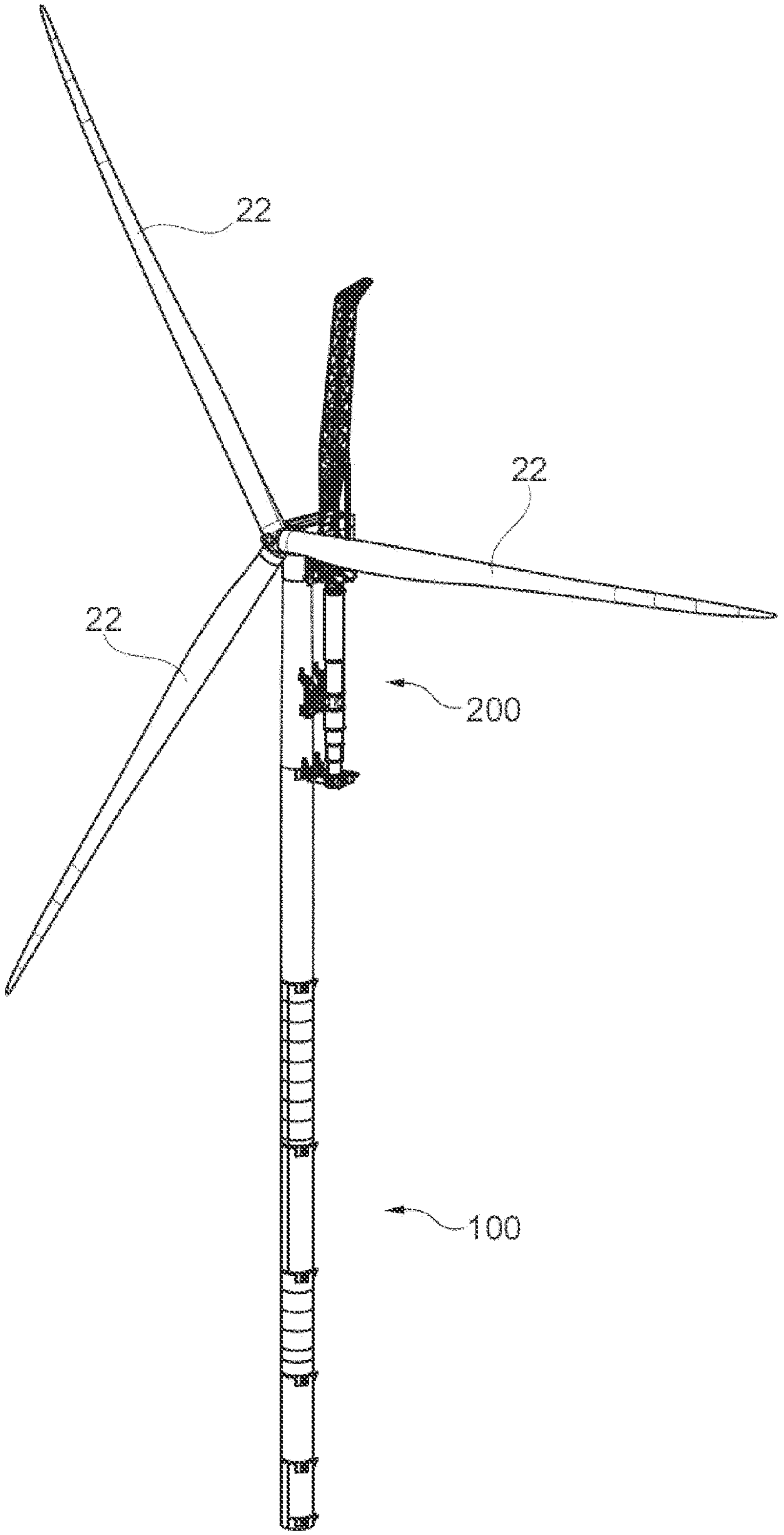

FIGS. 3A-3U schematically illustrate a method of erecting a wind turbine tower and a wind turbine. In FIG. 3A, a bottom tower section 120 is mounted on a foundation. The bottom tower section 120 may include pads 127 near an upper end 124 of bottom tower section 120 and pads 129 near a lower end 122 of tower section 120. Pads 127 and 129 are configured for gripping by clamps of crane assembly 200. As discussed previously, the crane assembly 200 includes a first (or upper) telescopic mast segment 400, a second (or lower) telescopic mast segment 300, and a central clamp assembly 500. The first telescopic mast includes a first (or upper) clamp assembly 410, and the second telescopic mast includes a second (or lower) clamp assembly 310. The crane assembly 200 further includes a crane 600.

In the situation illustrated in FIG. 3A, the bottom clamp assembly 310 may grip pads 129, and the lower central clamps of the central clamp assembly 500 may grip pads 127. Crane 600 may be used to hoist a further tower section 130.

In the situation illustrated in FIG. 3A, both the upper telescopic mast 400, and the lower telescopic mast 300 are both in their retracted position i.e. the crane assembly 200 has its most retracted (shortest) configuration.

In FIG. 3B, second tower section 130 is stacked on top of the bottom tower section 120. Tower section 130 includes a bottom end 134 and an upper end 132. Tower section 130 is attached at its bottom end 134 to tower section 120. Near its upper end 134, pads 137 for further gripping are arranged. After stacking the second tower section 130 on top of section 120, the upper clamp assembly 410 may grip pads 137.

In FIG. 3C, crane 600 may have been used to stack a further tower section 140 on top of tower section 130. Bottom end 144 of tower section 140 may be attached to top end 132 of tower section 130. Pads 147 may be provided near a top end of section 140.

The upper clamp assembly 410 may be released from pads 137. After this release, the upper telescopic mast 400 may be extended from is retracted state to a more extended state. In the extended state, several telescopic segments 422, 424, 426 of the upper telescopic mast are more visible. When the upper clamp assembly 410 reaches pads 147, as may be seen in FIG. 3D, the clamps of the upper clamp assembly may grip pads 147.

FIG. 3E illustrates that a further tower section 150 has been stacked on top of tower section 140. Near a top end 152 of the tower section 150, pads 157 for further gripping in different steps may be arranged.

In FIG. 3F, the central clamp assembly 500 has been released from pads 127 and has been moved upwards to approach pads 157. The central clamp assembly in this respect may be moved upwards by displacing the central clamp assembly 500 along the telescopic mast segments 300, 400, and the lower telescopic masts 300 has been extended to a more extended state, showing base 320, and segments 322, 324 and 326.

The central clamp assembly 500 may then grip the pads 157 which are gripped by the upper clamp assembly 410. The clamps 500 may grip portions of the pads on an inside with respect to where the upper clamp assembly grips pads 157.

Then, as shown in FIG. 3G, the upper telescopic masts 400 may be extended upwards. The upper clamp assembly may reach pads 157 near an upper end 152 of tower section 150 and grip these pads.

In FIG. 3H, the lower telescopic mast 300 may be retracted and thus moved upwards to reach pads 137 at an upper end of tower section 130. One aspect of the telescopic mast with independent telescopic segments and which are extendable in opposite directions means that the central clamp assembly 500 may be positioned somewhat centrally between the upper clamp assembly 410 and the lower clamp assembly 310 such that bending loads in the crane assembly 200 are maintained under control.

In FIG. 3I, the next tower section 160 is then positioned and mounted on top of tower section 150. The further steps in the erection of the tower 100 may continue in a similar manner.

In FIG. 3K, the central clamp assembly 500 has been moved upwards, the lower telescopic mast has been extended, and so has the upper telescopic mast such that pads 167 at the top of tower section 160 can be reached.

In FIG. 3L, a further tower section 170 may be positioned and mounted on tower section 160. As for the other tower sections, tower section 170 may include pads 177 at an upper end of the tower section.

In FIG. 3M, the lower telescopic mast 300 has been retracted such that the lower clamp assembly 310 reached pads 147 of tower section 140. In FIG. 3N, the central clamp assembly 500 has been moved upwards such that the central lower clamps, rather than the central upper clamps, grip pads 157.

FIGS. 30, 3P and 3Q illustrate further steps in the method of erecting tower 100 in which the crane assembly 200 climbs tower 100.

Finally, FIGS. 3R-3U illustrate that the same crane assembly 200 may be used to hoist top tower section 180, and nacelle 16. In this example, hub 20 may be hoisted and attached at a front side of the nacelle 16 (FIG. 3S). Subsequently, individual blades may be hoisted and attached to the hub 20. In this example, blades 22 are mounted to the hub in a substantially horizontal orientation (either at a 3 o'clock or a 9 o'clock position of the hub). In yet further examples, one or more blades may be attached to the hub and the assembly may be hoisted.

In FIG. 3U, the installation of the wind turbine has been completed. Then, the crane assembly 200 may descend the tower 100 by selectively gripping portions of the tower, releasing portions of the tower, and extending and retracting telescopic masts 300, 400.

Within the scope of the present disclosure, the dimensions of the several elements of the crane assembly 200 and of the tower 100 and of the tower sections, 120, 130, 140 etc. may be varied. In general, the dimensions of the crane assembly 200 may be adapted to a certain extend to the tower 100 to be erected. On the other hand, the upper and lower telescopic masts provide versatility and flexibility in this respect.

In examples, a diameter of the base 310, 410 of the telescopic masts may be e.g. between 3 and 5 meters. The length of segments 320, 322, 324, 436 and segments 420, 422, 424, 426 in the most retracted state may be e.g. between 10 and 20 meters. In examples, the upper telescopic mast 400 may have the same or similar dimensions as the lower telescopic mast 300. In other examples, the upper and lower telescopic masts may be different in size and may comprise different numbers of segments.

In examples, the crane 600 may have a boom with a length between 30 and 50 meters. In examples, the boom may be composed of several truss parts which are joint to each other.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A crane assembly for erecting a tower from a plurality of tower sections, the crane assembly comprising:

a first telescopic mast;

a second telescopic mast connected to the first telescopic mast;

a crane mounted on top of the first telescopic mast;

the first telescopic mast configured to increase in length from a retracted state in a first direction and comprising a first clamp assembly configured to selectively grip portions of the tower; and the second telescopic mast configured to increase in length from a retracted state in a second direction opposite to the first direction and comprising a second clamp assembly configured to selectively grip portions of the tower.

2. The crane assembly of claim 1, wherein the crane assembly is configured to climb the tower by selectively releasing the first and second clamp assemblies and changing the length of the first and second telescopic masts.

3. The crane assembly of claim 1, wherein the first telescopic mast comprises a first base and the second telescopic mast comprises a second base, and wherein the first base is mounted on top of the second base.

4. The crane assembly of claim 3, wherein the first telescopic mast further comprises one or more additional telescoping mast segments that are slidable relative to the first base.

5. The crane assembly of claim 4, wherein the additional telescoping mast segments comprise one or more intermediate segments and a most distal segment arranged furthest from the first base, the first clamp assembly configured on the most distal segment.

6. The crane assembly of claim 5, wherein the first clamp assembly is arranged at a distal end of the most distal segment.

7. The crane assembly of claim 1, wherein the first direction of the first telescopic mast is an upwards direction and the second direction of the second telescopic mast is a downwards direction.

8. The crane assembly of claim 1, further comprising a central clamp assembly arranged with the first or the second base.

9. The crane assembly of claim 8, wherein the central clamp assembly is displaceable along the first base and the second base.

10. The crane assembly of claim 9, wherein the central clamp assembly comprises two upper clamps and two lower clamps.

11. The crane assembly of claim 1, wherein one or both of the first and second clamp assemblies comprises first clamp arranged at a distal end of a first arm and a second clamp arranged at a distal end of a second arm.

12. The crane assembly of claim 11, wherein a distance between the first arm and the second arm is changeable by movement of one or both of the first and second arms.

13. A method for climbing a tower with a crane assembly, the method comprising:

positioning a first tower section on a foundation;

attaching the crane assembly to the first tower section;

stacking one or more additional tower sections on top of the first tower section using the crane assembly;

climbing the crane assembly along the additional tower sections by releasing a top clamp assembly of an upper telescopic mast of the crane assembly and extending the upper telescopic mast in an upwards direction and by releasing a bottom clamp assembly of a lower telescopic mast of the crane assembly and retracting the lower telescopic mast.

14. The method of claim 13, comprising climbing the crane assembly further along the additional tower sections by releasing a central clamp assembly from a first position on the tower and displacing the central clamp assembly upwards relative to the upper telescopic mast and gripping a portion of the tower at a higher second position with the central clamp assembly.

15. The method of claim 14, further comprising hoisting one of the additional tower sections while the central clamp assembly grips a portion of the tower and is positioned at a same distance from the lower clamp assembly and the top clamp assembly.

* * * * *